US006046374A

United States Patent [19]
Stephens

[11] Patent Number: 6,046,374
[45] Date of Patent: Apr. 4, 2000

[54] CELLULAR GROUT RADIATION BARRIER

[76] Inventor: Patrick J. Stephens, 1276 Chuckanut Dr., Bellingham, Wash. 98225

[21] Appl. No.: 09/167,526

[22] Filed: Oct. 6, 1998

Related U.S. Application Data

[63] Continuation of application No. 08/842,949, Apr. 25, 1997, Pat. No. 5,819,186
[60] Provisional application No. 60/016,354, Apr. 26, 1996.
[51] Int. Cl.[7] .................................................. G21F 9/00
[52] U.S. Cl. .............................. 588/3; 588/9; 588/15; 588/16; 588/252; 250/506.1; 106/672; 106/718; 106/733; 976/DIG. 394
[58] Field of Search ............................ 588/3, 9, 15, 16, 588/252; 250/506.1; 106/672, 718, 733; 976/DIG. 394

[56] References Cited

U.S. PATENT DOCUMENTS

| | | |
|---|---|---|
| 2,716,705 | 8/1955 | Zinn . |
| 4,466,833 | 8/1984 | Spangle . |
| 4,842,773 | 6/1989 | Kunz et al. . |
| 4,868,400 | 9/1989 | Bainhart et al. . |
| 4,950,426 | 8/1990 | Markowitz et al. . |
| 5,098,612 | 3/1992 | Rowsell . |
| 5,143,654 | 9/1992 | Kituchi et al. . |
| 5,241,993 | 9/1993 | Stephens . |
| 5,275,654 | 1/1994 | Cowan . |
| 5,419,632 | 5/1995 | Stephens . |
| 5,427,154 | 6/1995 | Stephens . |
| 5,464,473 | 11/1995 | Shiao . |
| 5,494,514 | 2/1996 | Goodson et al. . |

*Primary Examiner*—Ngoclan Mai
*Attorney, Agent, or Firm*—Todd N. Hathaway

[57] ABSTRACT

A method for forming a radiation-absorbing barrier around a radioactive component by flowing a radiation-absorbing cement grout into a container which encloses the component. The radiation-absorbing cement grout comprises a cement slurry, a finished foam material, a bentonite gel, and a radiation-absorbing metal constituent.

15 Claims, 2 Drawing Sheets

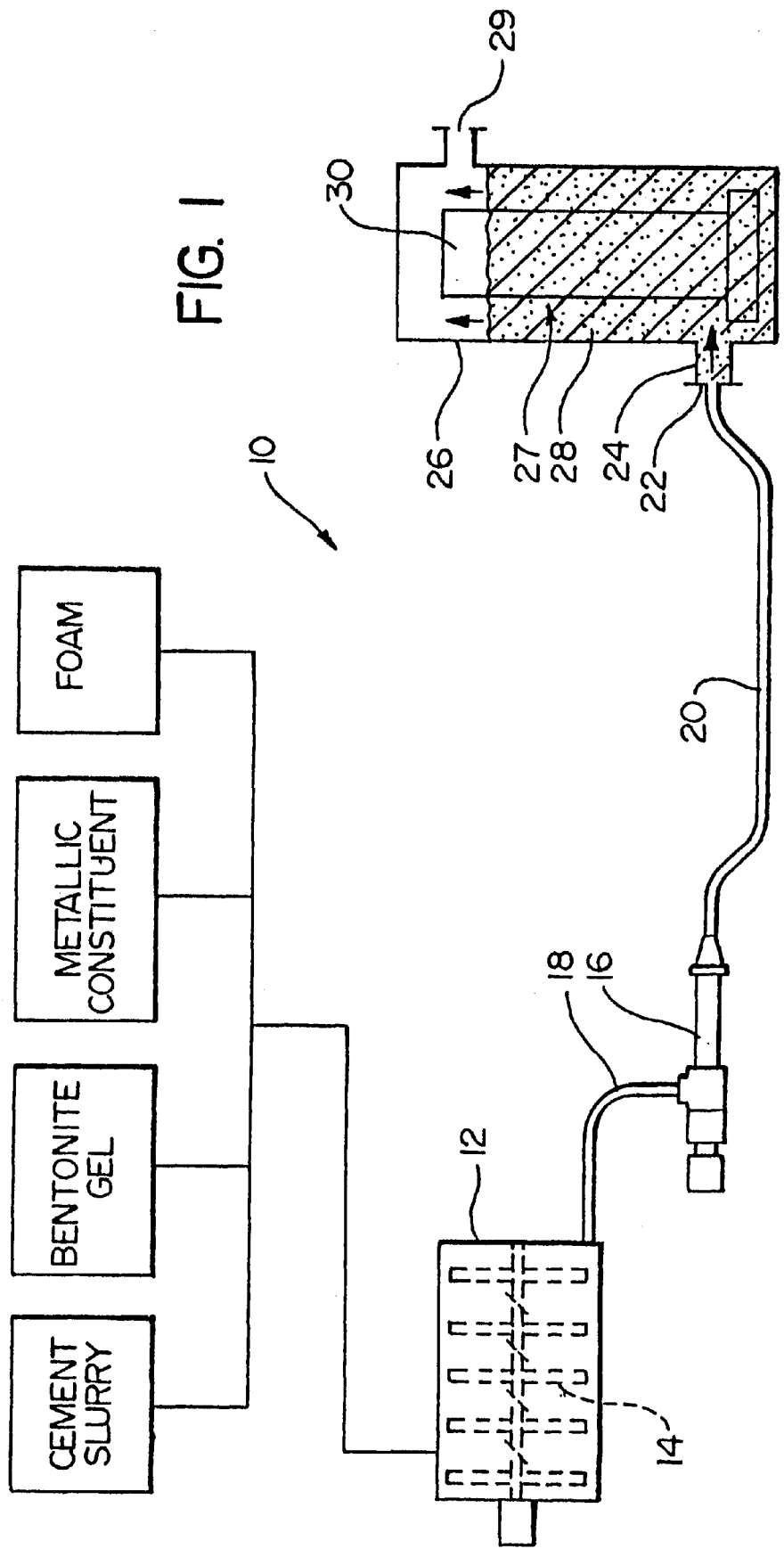

CELLULAR GROUT RADIATION BARRIER

This application is a continuation of Ser. No. 08/842,949 filed Apr. 25, 1997 now U.S. Pat. No. 5,819,186, and a provisional of application number 60/016,354 filed Apr. 26, 1996.

BACKGROUND OF THE INVENTION a. Field of the Invention

The present invention relates generally to low-density cellular concretes, and, more particularly, to the low-density cellular cement grout which provides the radiation barrier for use in the decommissioning and removal of reactor components and similar structures presenting a radioactive hazard.

b. Background Art

The decommissioning of nuclear power plants, such as nuclear electrical power generating stations and warship propulsion systems, typically involves a dismantling of the reactor systems at the plant site or vessel, and then transporting these to a designated disposal/storage area.

In conventional nuclear power systems, the main components are housed in one or more containment vessels; for example, separate containment vessels are commonly employed for the steam generator and the reactor core, and these components are connected by various pipe lines which are originally designed for the circulation of heating/cooling water and/or other fluids. In the typical dismantlement operation, each containment vessel is cut out of the system and removed individually, with the internal components remaining housed inside the vessel.

Typically, the dismantlement and transportation operations are fraught with a number of difficulties. Firstly, the residual radioactivity in the vessel and its internal components is usually quite high and presents a continuing hazard, both to workmen and during transportation; typically, the residual radiation includes both gamma ray radiation and neutron radiation. The radiation hazard normally exists throughout the system, but is typically most intense in the case of the reactor vessel which originally contained the reactor core; in many cases, the radiation hazard is so intense that even simple cutting/removal operation require rotation of a number of workers, each of which can be exposed to the radiation for only a very limited period of time.

A particular problem in this context is how to provide effective shielding for the "hot" components in reactor vessels for transportation and long-term storage, so that they do not present a virtually perpetual hazard to personnel in the area. The presently accepted practice calls for a very thick (e.g., 8–10") steel plate casing to be built around the component/vessel, in a manner resembling a shell. The thick layer of iron in the shell provides highly effective shielding, but the technique is vastly expensive in practice. Not only are there the costs ordinarily associating with erecting such a structure of what amounts to be thick armor plate, but the cost is greatly compounded by the necessity of having personnel work in a radioactively "hot" environment. For example, personnel involved in erecting and welding the shell generally remain on a station for a brief time before having to be rotated off of their job, and the same goes for inspectors. Moreover, because of the sensitive nature of the work, the construction work and welding is for the most part performed by skilled boiler makers, at much higher rates than ordinary welding personnel. As a result, the cost of constructing the armor shells can amount to many millions of dollars for each reactor vessel/component.

Although it has been known to construct reactor building walls of concrete with imbedded steel punchings for shielding purposes, this technique is not a viable option for encasing reactor components during removal. Moreover, such concrete mixes, which are ordinarily dumped between forms to construct the walls, are extremely coarse and lack fluidity, and are therefore incapable of being pumped into and filling the sometimes intricate voids around reactor components and containment vessels, or through the complex and often small-diameter piping and chambers which are commonly present in these components.

Accordingly, there exists a need for a method for shielding reactor vessels and other components which are being removed from decommissioned nuclear power plants, without requiring the construction of massive armor shielding. Furthermore, there is a need for such a method which can be performed on a fairly quick basis so as to minimize the high personnel costs which are ordinarily associated with this type of work. Still further, there is a need for such a method which employs a comparatively inexpensive shielding material, and a material which is sufficiently fluid that it can be installed in and around components having fairly complex contours and cavities. Still further, there is a need for such a material which will effectively reduce the emitted levels of both gamma and neutron radiation.

SUMMARY OF THE INVENTION

The present invention is a method for forming a radiation barrier around a radioactive component. Broadly, this comprises the steps of: (1) providing a container which encloses the radioactive component, (2) forming a cellular cement grout, said grout comprising in mixture a cement slurry, a finished foam material, a bentonite gel material, and a radiation-absorbing metal constituent, and (3) pumping the cellular cement grout into the container so that the cellular cement grout form a radiation-absorbing barrier around the component which is enclosed therein.

The step of providing the container which encloses the radioactive may comprise the step of constructing a metallic shell around the radioactive component.

The metal constituent of the grout may be an iron-containing material, such as rounded steel shot. The metal constituent may also be formed of other radiation absorbing metallic materials, such as barium-containing materials.

BRIEF DESCRIPTION OF THE DRAWINGS

FIG. 1 is a schematic view of the system in accordance with the present invention for producing a foamed cement grout having both bentonite and barium compound components, and for pumping this into a nuclear containment vessel for reducing the residual radiation which is produced thereby;

DETAILED DESCRIPTION a. Overview

Figure 2A:
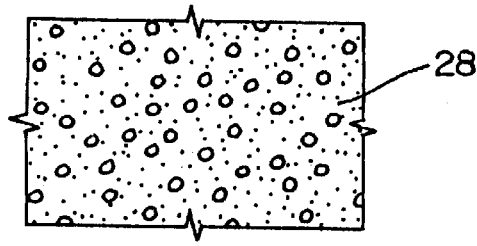
FIG. 2A is the view of the cellular fill materials which is produced by the present invention for filling the containment vessel.

The present invention provides a novel method for the encapsulation of radioactively "hot" reactor vessels and other components, in which a comparatively thin, inexpensive shell of steel or similar material is constructed around the component, and the gap between the shell and component is filled with a fluid, cellular cement grout material which is laden with a metallic constituent to provide the shielding function. The size of the gap, and therefore the thickness of the grout layer, is selected based on the shielding qualities of the grout material to provide an effective radiation barrier in combination with the comparatively thin metal shell, and the fluidity of the grout material enables it to flow quickly and reliably through the interior of the shell and into any openings or irregular cavities on the component itself. The present invention also provides a novel cellular cement fill material which is easily and quickly pumped in place to provide an effective radiation barrier which reduces levels of both gamma and neutron radiation, and apparatus for production and injection of the same. The grout mixture is sufficiently fluid that this can also be pumped into containment vessels using the original piping system, if desired.

The pumpable cellular grout material employs a mixture of cement slurry and bentonite gel, finished foam, and a metallic gamma-radiation absorptive material, such as a barium compound. The constituents are mixed, either in a batch process or using continuous-generation equipment, to form a micro-bubble structure in which the individual bubbles are encased in a layer of the bentonite gel, which enables the bubble structure to support the comparatively heavy barium or other heavy-metal compound in particulate or granular form.

The barium or other heavy metal constituents provide an effective shield for absorbing the gamma radiation, while the bentonite component provides effective shielding to reduce neutron radiation, in addition to producing the strong, stable bubble structure which supports the heavy metal component.

FIG. 1 shows a batch-type system 10 for producing and injecting the cellular grout material described above. As can be seen, the constituents of the grout, i.e., cement slurry, bentonite gel, metallic component, and finished foam are combined in a tub 12 by a mixer 14 to produce the pumpable cement grout material described above. The material is fed into a pump 16, via line 18, is discharged under pressure through an injection hose 20. Hose 20 is connected to an injection fitting 22 which is in communication with the interior of the barrier shell 26.

As was noted above, in the present invention the barrier shell 26 is constructed of much lighter (e.g., 1") steel plate or similar material, rather than the very thick steel plate which is employed in the conventional method. This enables the shell to be constructed in a far quicker, more economical manner. Owing to the fact that in most embodiments of the present invention the shielding which is provided per inch of thickness by the of the fill material using the granular metallic constituent will be somewhat less than that of a solid layer of the metal, however, the shell 26 is constructed so as to form a comparatively large spaced gap 27 around the containment vessel or other component 30. The size of this gap is select to provide a thickness of the cellular fill material which, in combination with the comparatively thin metal shell, will provide an effective radiation barrier to reduce external radiation levels to within acceptable limits.

Owing to its cellular nature and the bentonite component the grout 28 is highly fluid, so that as the grout is pumped into the shell 26 this fills the cavity around the containment vessel 30 or other component, forming a "blanket" completely around the component which absorbs both gamma and neutron radiation. The high degree of fluidity of the grout material permits the shell to be filled safely in one or more lifts, with the grout flowing upwardly to the next injection port 29 in the direction indicated by the arrows in FIG. 1, without fear of the flow stopping or becoming blocked.

Once solidified, the bentonite and suspended metallic constituent in the blanket of grout reduce the amount of radiation which reaches the barrier shell 26 so that the relatively this layer of solid steel or other metal is sufficient to reduce the intensity of external radioactive emissions to acceptable levels. The outer metal shell also protects the solidified cement grout from impact damage and abrasion during transportation and storage, and in some embodiments the impact resistance of the barrier may be supplemented by the increased modulus of elasticity which the cellular cement grout can offer in certain formulations. Furthermore, unlike a liquid or loose granular material, the solidified grout cannot accidently escape from the containment shell, and therefore provides a permanent enclosure which reduces the chances of a radiation leak at the ultimate storage/disposal site. Still further, the solidified cement grout is virtually impervious to corrosion, which is an important advantage for very long term storage.

b. Grout Constituents

As was noted above, the principal constituents of the grout provided by the present invention are cement slurry, bentonite gel, a metallic constituent and finished foam. Exemplary processes for the production and mixing of the same will be described in the following paragraphs.

The cement slurry may be formed using any suitable hydraulic cement. Preferably, this is be formed using ordinary portland cement dust (with or without materials such as fly ash, superplasticizers, and other substitutes/additives which are known to those skilled in the art), mixed with water in a suitable ratio to meet both the fluidity and compressive strength requirements for the product. For example, a water-to-cement ratio of approximately 0.5:1 may be suitable for many embodiments; however, a wide range of water-to-cement ratios may be employed in various embodiments, depending on the characteristics which are desired for the slurry.

In order to provide a more stable bubble structure, the cement slurry is preferably colloidally mixed to produce a finer, more fluid slurry which will more evenly coat the individual bubbles of the finished foam. This colloidal mixing may be performed using a high speed, high-shear pump which circulates the slurry material through a holding tank, until the cement particles are finely divided and evenly hydrated by the water molecules.

The finished foam component, in turn, may employ any of the suitable foam-generation materials which are known to those skilled in the art for use in the production of cellular cements and grouts. The aqueous foam materials which are preferred for use in the present invention typically consist of a foam concentrate material similar to a surfactant which is diluted with water to form a foam solution having a suitable concentration. Examples of suitable foam concentrate materials include "Mearl Geocel Foam Liquid", available from the Mearl Corporation, Roselle Park, N.J.

The foam concentrate-water solution is combined with air and passed through a foam conditioner to produce a finished foam material having the microbubble structure. Preferably, the foam density should be selected so as to produce a relatively strong bubble structure; for example a 2.25–4.0 percent water-concentrate solution mixed with air to produce a foam weight in a range from about 2.25–4.0 pounds per cubic feet (pcf) may be suitable, although concentrations and weights well outside of these ranges may be suitable for some applications.

The production of finished foam and the mixing thereof with cement slurry to produce a foamed cement grout is more fully described in U.S. Pat. No. 5,419,632, which is incorporated by reference herein in its entirety, the inventor of which is the same as in the present application.

As was noted above, the metal component serves to provide the grout material with the ability to absorb gamma radiation. The metal constituent will in most embodiments be in granular form and may include one or more types of metals or metal alloys. Preferably, the metal or metals selected will have characteristics which are benign to both personnel and the environment; amongst the many known gamma-absorbing metal known to those skilled in the art which are suitable for use in the present invention, barium and barium compounds are perhaps best in terms of effective shielding, but iron/steel has the advantage of economy, even though more material may need to be used.

The type and amount of residual radiation present will generally determine the amount (i.e., the ratio) of the metal constituent to be included in the grout matrix; for example, in some embodiments an iron or barium component may be present in an amount equal to twice the weight of the cement or more. Granular barium sulfate is suitable for the purpose, and may be re-ground (e.g. using a ball mill) prior to mixing with the other constituents. A more economical component for most applications is smooth tumbled/polished steel shot, such as size 2–4 bird shot or a similar material, for example. Much finer grades of shot are less desirable for most embodiments, in that the greater surface area per weight of the material will tend to require an excessive amount of water and cement to coat, and will therefore result in lighter mixes and less effective shielding because not as much steel particulate can be included while still keeping the material fluid and pumpable. On the other hand, much larger particles such as buckshot-sized steel shot, for example, will tend to render the mix coarse and less fluid and pumpable, to the point where its flowability within the barrier shell may be impaired and the water may be squeezed out of the mix when pumping; also, the increased weight will render it difficult for the cellular bubble structure to maintain the larger particles in suspension. Furthermore, smooth, generally spherical particles are generally preferable, and sharp, angular particulate materials such as slags and blast metals should generally be avoided.

Although iron/steel and barium materials are readily available and advantageous for use in the present invention, various other suitable heavy element materials capable of absorbing gamma radiation will occur to those skilled in the art. For example, tin, iron, thallium and lead, and their various compounds, can be used in the present invention to absorb gamma radiation, although most lead compounds exhibit undesirable toxicities. Antimony and antimony-containing compounds can also be used to provide the gamma radiation shielding component, and these are generally less expensive than tin-containing compounds. Suitable elements/compounds may also be found from within the rare earths, particularly the lanthanum series.

Finally, the bentonite constituent serves three purposes. Firstly, it forms a bubble structure which is sufficiently strong to support the heavy metal (gamma shield) constituent. For example, if a heavy metal particulate were to be added to a conventional foamed cement grout (such as the materials which are conventionally used for geotechnical fills), the weight of the particulate would cause the components to separate and result in collapse of the bubble structure; by way of illustration, it should be noted that barium materials are on average approximately seven times as heavy per volume as water. The bentonite gel, however, serves to encapsulate the bubbles within the grout material, so that these are able to absorb and carry the heavy metal constituent.

Figure 2B:
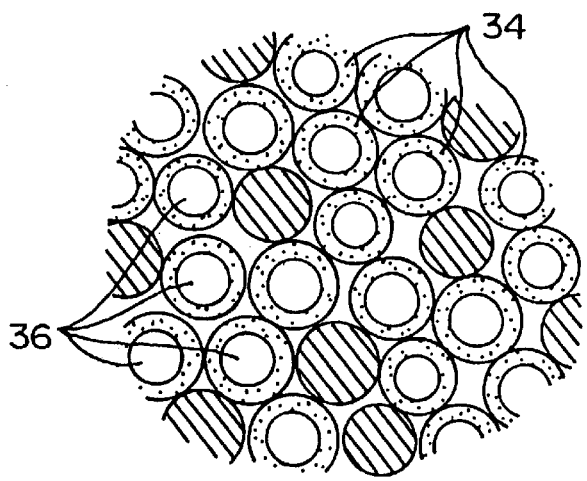
FIG. 2B is an enlarged view of the cellular matrix of FIG. 2A.
Figure 2C:
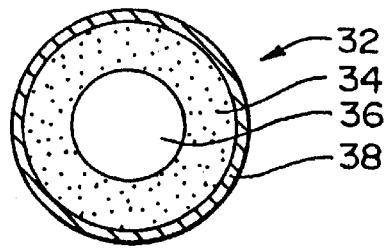
FIG. 2C is an enlarged view of an individual bubble of the material in another embodiment, showing the layered structure thereof.

This aspect of the present invention is illustrated somewhat schematically in FIGS. 2A–2C. FIG. 2A is a "macro" view showing the cellular matrix of the grout material 28. As can be seen in the enlarged view presented by FIG. 2B, the matrix includes a multiplicity of fine, sometimes microscopic bubbles 32 formed by the finished foam and containing entrained air 36, each of which is surrounded by a relatively thick encapsulating layer of the combination bentonite gel/cement slurry 34; as was noted above, this material is highly fluid and "slippery," and essentially provides a strong, resilient capsule which enhances the resistance of the bubble to collapse/rupture and also makes it easier to pump (i.e., it requires lower pumping pressures). The heavy metal particles 37, such as the steel shot described above, are interspersed in and supported by the tough, resilient bentonite/cement coated bubbles, which also cushion and surround the metal particles to render the matrix more fluid and pumpable. Moreover, although not shown in FIG. 2B, a layer or coating of the bentonite/cement slurry will also be formed on the grains of metal as well, further enhancing fluidity and flowability.

Also, as can be seen in FIG. 3C, in some embodiments the heavy metal constituent (such as a barium sulfate material, for example) may enter solution or otherwise be dispersed so as to itself form a layer 38 which surrounds and is supported by the bentonite gel/cement layer without damage to the underlying bubble structure.

The bentonite gel can be mixed in any suitable manner, following the supplier's specifications; a suitable amount for many applications may be in the range of about 5–15% of the total, by weight. Preferably, to produce the gel-like consistency, the bentonite is colloidally mixed in a manner similar to that described above, by recirculation using a high-speed, high-shear colloidal mixing pump. The colloidal mixing superwets the particles of the bentonite, producing a high-grade gel material. Examples of a suitable colloidal mixing pumps include Series A ANSI centrifugal process pumps available from Hayward Gordon Company, Buffalo, N.Y.

The second purpose of the bentonite component is to increase the fluidity of the cellular fill material. The bentonite gel forms a very smooth, highly fluid coating on the bubbles and metal particles alike, so that the material pumps easily and will flow long distances within the barrier shell and into various cavities and irregularities on the vessel or other component which is encased therein.

The third function served by the bentonite gel is neutron radiation shielding. Bentonite materials are naturally occurring clay materials (usu. sodium montmorillonite) containing complicated silicon structures and water; in particular, as relates to the present invention, bentonites contain large amounts of light metals which are effective neutron radiation barriers. Because the bentonite is a major constituent or the grout, both by weight and volume (for example, in some embodiments the mix may contain bentonite in an amount equal to or greater than the portland cement), the fill material achieves a very significant drop in neutron radiation intensity.

Yet another advantage provided by the bentonite component is that this results in a water-impervious grout fill, which again benefits long-term storage under various environmental conditions.

It should also be understood that other suitable, gel-forming materials may in some embodiments be used in conjunction with the bentonite, or possibly in place of the bentonite if the material can alone or in combination with other materials provide the functions described above. For example, the "Polyox" material available from Union Carbide Company may be suitable for use in some embodiments of the present invention.

As was noted above, the cellular grout material may be prepared by batch or continuous process. In the continuous process, the components may be added from their respective sources (e.g. the bentonite gel from the colloidal mixing tub, the cement/barium from another tub, and so forth) with foam solution and air being added at metered rates and then passed through a conditioner to form the bubble structure.

Figure 3:
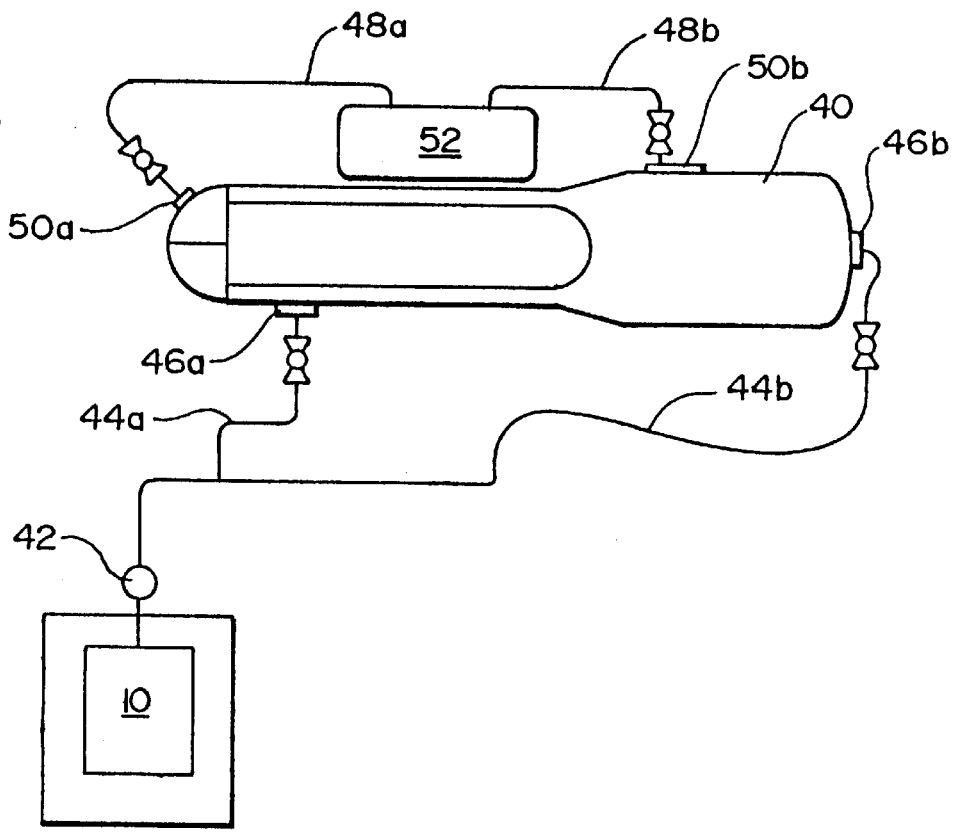
FIG. 3 is a schematic view of the containment vessel being filled with the grout material in accordance with the present invention, using inlet and outlet fittings attached to original circulation fittings of the vessel.

FIG. 3 is a schematic view showing the filling of an exemplary nuclear containment vessel 40 (in this illustration, a steam generation vessel) itself, rather than a separate casing or enclosure which surrounds the vessel as described above, using the cellular cement grout of the present invention and the existing (i.e. original) valving of the component. As can be seen, the grout generation apparatus 10 may be mounted on a skid or other structure for transportation to the site. The grout material is delivered to the containment vessel by pump 42, through fill lines 44A,44B which are attached to fittings 46A,46B on the vessel. Vent lines 48A,48B are connected to other pipe connections 50A,50B on the vessel, so as to release the air and excess grout from the vessel. The released material, which may be contaminated from the contents of the vessel, is vented to a collection container 52. Upon completed filling, the vessel can be removed from the structure (e.g. the reactor building or the ship's hull) for subsequent transportation and disposal. In this embodiment, the placement of grout inside the containment vessel provides a very quick and economical method for reducing radiation levels external to the vessel, both to create a safer work environment in which personnel stay times are increased, and to permit final shielding using a comparatively thin external shell, with or without filling the void between the two as previously described. Also, it is possible that in some circumstances the radiation barrier fill within the containment vessel may reduce radiation levels sufficiently that a separate external shell will not be required for storage/disposal of the component.

It is to be recognized that various alterations, modifications, and/or additions may be introduced into the constructions and arrangements of parts described above without departing from the spirit or ambit of the present invention.

What is claimed is:

1. A cellular cement grout for forming a radiation barrier around a radioactive component, said grout comprising in mixture:

a cement slurry;

a finished foam material;

a gel-forming material; and a radiation-absorbing metal constituent.

2. The grout of claim 1, wherein said gel-forming material comprises a bentonite gel material.

3. The grout of claim 1, wherein said radiation-absorbing metal constituent comprises an iron-containing material.

4. The grout of claim 1, wherein said radiation-absorbing metal constituent comprises a barium-containing material.

5. The grout of claim 1, wherein said radiation-absorbing metal constituent comprises a rounded metal shot material.

6. The grout of claim 5, wherein said rounded metal shot material comprises rounded steel shot material.

7. The grout of claim 6, wherein said rounded steel shot material comprises steel shot in the size of approximately size 2 to size 4 bird shot.

8. A cellular cement grout for forming a radiation barrier around a radioactive component, said grout comprising in mixture:

a cement slurry;

a finished foam material;

a bentonite gel material; and a radiation-absorbing metal constituent.

9. A radiation barrier for a radioactive component, said barrier comprising:

a container which encloses said radioactive component; and a cellular cement grout which forms a radiation barrier in said container around said radioactive component, said grout comprising in mixture:

a cement slurry;

a finished foam material;

a gel-forming material; and a radiation-absorbing metal constituent.

10. The barrier of claim 9, wherein said gel-forming material comprises a bentonite gel material.

11. The barrier of claim 9, wherein said radiation-absorbing metal constituent comprises an iron-containing material.

12. The barrier of claim 9, wherein said radiation-absorbing metal constituent comprises a barium-containing material.

13. The barrier of claim 9, wherein said radiation-absorbing metal constituent comprises a rounded metal shot material.

14. The barrier of claim 13, wherein said rounded metal shot material comprises rounded steel shot material.

15. The barrier of claim 14, wherein said rounded steel shot material comprises steel shot in the size of approximately size 2 to size 4 bird shot.

* * * * *